US008380860B2

(12) United States Patent
Nagpal et al.

(10) Patent No.: US 8,380,860 B2
(45) Date of Patent: Feb. 19, 2013

(54) REDUCING CARBON FOOTPRINT AND PROVIDING POWER SAVINGS IN SESSION INITIATED PROTOCOL CONFERENCING

(75) Inventors: Abhinay R. Nagpal, Hadapsar (IN); Sandeep R. Patil, Elmsford, NY (US); Sri Ramanathan, Lutz, FL (US); Gandhi Sivakumar, Victoria (AU); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 12/942,499

(22) Filed: Nov. 9, 2010

(65) Prior Publication Data

US 2012/0117149 A1 May 10, 2012

(51) Int. Cl.
G06F 15/16 (2006.01)
(52) U.S. Cl. .................. 709/228; 709/224; 713/320
(58) Field of Classification Search .......... 709/200–205, 709/217–227, 228; 713/300, 310, 320
See application file for complete search history.

(56) References Cited

U.S. PATENT DOCUMENTS

| 6,850,539 | B1 * | 2/2005 | Cassiers et al. ............... 370/465 |
| 7,369,536 | B2 | 5/2008 | Donovan et al. |
| 7,577,857 | B1 | 8/2009 | Henderson et al. |
| 7,586,857 | B2 | 9/2009 | Ejzak et al. |
| 7,596,686 | B2 * | 9/2009 | Dubinsky .......................... 713/2 |
| 7,631,093 | B2 | 12/2009 | Sternagle |
| 7,738,492 | B2 | 6/2010 | Lauwers et al. |
| 8,145,761 | B2 * | 3/2012 | Liu et al. ....................... 709/226 |
| 8,145,920 | B2 * | 3/2012 | Tsai et al. ...................... 713/300 |
| 8,156,353 | B2 * | 4/2012 | Tsai, Jr. ......................... 713/310 |
| 2004/0128564 | A1 * | 7/2004 | Dubinsky ....................... 713/300 |
| 2005/0044127 | A1 | 2/2005 | Jaiswal et al. |
| 2007/0161352 | A1 * | 7/2007 | Dobrowski et al. .............. 455/69 |
| 2008/0101335 | A1 | 5/2008 | Badger |
| 2008/0212499 | A1 | 9/2008 | Maes |
| 2008/0279118 | A1 | 11/2008 | Hyun et al. |
| 2008/0304519 | A1 * | 12/2008 | Koenen et al. ................. 370/477 |
| 2009/0077396 | A1 * | 3/2009 | Tsai et al. ....................... 713/310 |
| 2009/0190736 | A1 | 7/2009 | Bertin et al. |
| 2009/0254674 | A1 | 10/2009 | Leiden et al. |
| 2010/0011230 | A1 | 1/2010 | Mater |
| 2010/0150030 | A1 | 6/2010 | Whitney et al. |
| 2010/0165897 | A1 * | 7/2010 | Sood .............................. 370/311 |
| 2011/0176463 | A1 * | 7/2011 | Cowan et al. ................. 370/311 |

OTHER PUBLICATIONS

"Session Initiation Protocol", http://en.wikipedia.org/wiki/Session_Initiation_Protocol, Wikipedia, Oct. 5, 2010, pp. 1-8.
"Ultra Symmetric High Bandwidth with Port Bonding", ZyXEL, 2006, pp. 1-4.
"2.5. Link Aggregation and High Availability with Bonding", http://linux-ip.net/html/ether-bonding.html, printed Nov. 8, 2010, pp. 1-2.
"Power Management for Network Devices in Windows 7", http://technet.microsoft.com/en-us/library/ee617165%28WS.10%29.aspx, Microsoft TechNet, Sep. 22, 2009, pp. 1-6.
"IP Multimedia Subsystem", http://en.wikipedia.org/wiki/IP_Multimedia_Subsystem, printed Nov. 8, 2010, pp. 1-14.

* cited by examiner

Primary Examiner — Moustafa M Meky
(74) Attorney, Agent, or Firm — Matthew Chung; Roberts Mlotkowski Safran & Cole, P.C.

(57) ABSTRACT

A method includes determining a first subset of a plurality of links to be set to a first power state and a second subset of the plurality of links to be set to a second power state, different from the first power state, based on estimated data transmission. The method also includes instructing at least one network apparatus to set the first subset of the plurality of links to the first power state and to set the second subset of the plurality of links to the second power state different from the first power state.

25 Claims, 5 Drawing Sheets

REDUCING CARBON FOOTPRINT AND PROVIDING POWER SAVINGS IN SESSION INITIATED PROTOCOL CONFERENCING

TECHNICAL FIELD

The present invention generally relates to network power management and, more particularly, to methods and systems for reducing carbon footprint and providing power savings in Session Initiated Protocol (SIP) conferencing.

BACKGROUND

The Session Initiated Protocol is a text-based signaling protocol that can be used for controlling networked multimedia communication sessions such as voice and video calls over Internet Protocol (IP). SIP is commonly used for setting up and tearing down voice and video calls between two parties (e.g., unicast sessions) or more than two parties (e.g., multicast sessions) with one or several media streams. SIP is commonly used for large scale multiparty conferencing (e.g., up to hundreds of participants) using multicast techniques. Participants in SIP conferencing may be spread across a varied network topography and may communicate with each other via the SIP conference using numerous protocols including public switched telephone network (PSTN), mobile telephony (e.g., 2G, 3G, etc.), wireless broadband, wireline broadband, etc.

Energy management is becoming an increasingly important issue in network communications. In the past, many service providers, including Internet service providers, enterprise service providers, and others, ignored or de-prioritized energy management in an effort to provide maximal data handling capacity. However, the current business climate includes an emphasis on more energy efficient operations, which is leading service providers and others to look toward energy management as a higher priority design consideration than in the past.

SUMMARY

In a first aspect of the invention, there is a method implemented in a computer infrastructure having computer executable code tangibly embodied on a computer readable storage medium having programming instructions operable to implement the steps of the method. The method includes: determining a first subset of a plurality of links to be set to a first power state and a second subset of the plurality of links to be set to a second power state, different from the first power state, based on estimated data transmission; and instructing at least one network apparatus to set the first subset of the plurality of links to the first power state and to set the second subset of the plurality of links to the second power state.

In another aspect of the invention, a system includes a conference server comprising a processor, a memory, and a power manager application. The power manager application operates to: obtain conference data; determine estimated data transmission based on the conference data; identify at least one first link to be set in a high power state and at least one second link to be set in a low power state based on the estimated data transmission; and instruct at least one network apparatus to set the at least one first link to the high power state and to set the at least one second link to the low power state.

In an additional aspect of the invention, a computer program product comprising a computer usable storage medium having readable program code embodied in the medium is provided. The computer program product includes at least one component operable to: obtain conference data associated with Session Initiated Protocol (SIP) conferencing; determine estimated data transmission based on the conference data; identify a first subset of a plurality of links to be set in a high power state and a second subset of the plurality of links to be set in a low power state based on the estimated data transmission; and instruct at least one network apparatus to set the first subset of a plurality of links to the high power state and to set the second subset of a plurality of links to the low power state.

In a further aspect of the invention, a computer system for at least one of modeling and forecasting technology adoption, the system comprises a CPU, a computer readable memory and a computer readable storage media. Additionally, the system comprises first program instructions to obtain conference data associated with Session Initiated Protocol (SIP) conferencing; second program instructions to determine estimated data transmission based on the conference data; third program instructions to identify a first subset of a plurality of links to be set in a high power state and a second subset of the plurality of links to be set in a low power state based on the estimated data transmission; and fourth program instructions to instruct at least one network apparatus to set the first subset of a plurality of links to the high power state and to set the second subset of a plurality of links to the low power state. The first, second, third, and fourth program instructions are stored on the computer readable storage media for execution by the CPU via the computer readable memory.

In another aspect of the invention, there is a method implemented in a computer infrastructure having computer executable code tangibly embodied on a computer readable storage medium having programming instructions operable to implement the steps of the method. The method includes: obtaining conference data associated with Session Initiated Protocol (SIP) conferencing; determining estimated data transmission based on the conference data; determining a first subset of a plurality of links to be set to a high power state and a second subset of the plurality of links to be set to a low power state, lower than the high power state, based on the estimated data transmission; and instructing at least one network apparatus to set the first subset of the plurality of links to the high power state and to set the second subset of the plurality of links to the low power state. The at least one network apparatus comprises at least one of: at least one router, at least one switch, and at least one network interface card (NIC). The at least one network apparatus comprises the plurality of links. The plurality of links comprises physical links configured to transmit and/or receive bits in network communications. At least one link in the second subset of the plurality of links is bonded in a link aggregation group (LAG) and is set to the low power state while maintained in the LAG. The obtaining the conference data comprises: obtaining subscriber information from a Home Subscriber Service (HSS); obtaining presence information from a presence server; and obtaining a conference schedule from a conference object

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
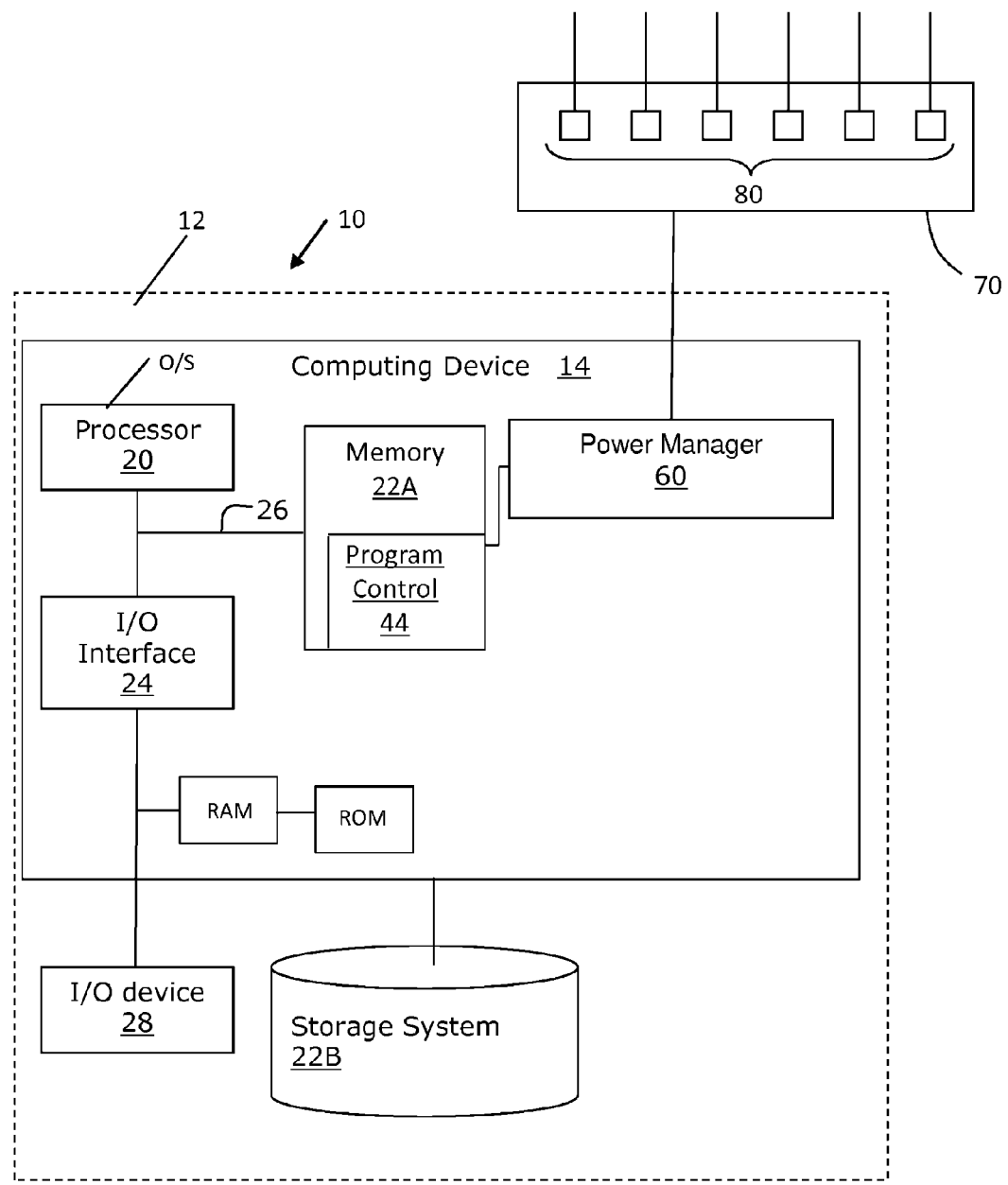
FIG. 1 an illustrative environment for implementing the steps in accordance with aspects of the invention.

The present invention generally relates to network power management and, more particularly, to methods and systems for reducing carbon footprint and providing power savings in Session Initiated Protocol (SIP) conferencing. In accordance with aspects of the invention, data associated with SIP conferencing is used to estimate data transmission for a SIP-based conference, and these estimates are used to optimize network power consumption by making some network hardware available for supporting the conference while also forcing other network hardware into a low-power state. In embodiments, the estimates may be based on conference data including, but not limited to: conference schedule, number of conference participants, locations of participants, network connections utilized by participants, type of data being transferred during the conference, and video feed quality, etc. In embodiments, the estimates are used in a look-ahead manner to predict data transmission of the conference, and to force redundant and/or underutilized physical links into a low power mode based on the predicted data transmission needs. The estimates, and therefore the forced low-power links, may be updated as the conference data changes. In this manner, implementations of the invention provide for proactively managing power usage in network communications based on SIP conferencing data.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, the environment 10 includes a server or other computing system 12 that can perform the processes described herein. In particular, the computing system 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S). The memory (e.g., 22A) may store business intelligence, data mining, regression analysis and/or modeling and simulation tools for execution by the processor 20.

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls a power manager 60 configured to perform one or more of the processes described herein. The power manager 60 can be implemented as one or more program code in the program control 44 stored in memory 22A as separate or combined modules. Additionally, the power manager 60 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention. The bus 26 provides a communications link between each of the components in the computing device 14.

In accordance with aspects of the invention, the power manager 60 communicates with at least one network apparatus 70 that comprises at least one physical link 80 over which data is transmitted in a network, such as an IMS (IP Multimedia Subsystem) enabled network. For example, the at least one network apparatus 70 may comprise at least one of: at least one router, at least one switch, at least one network interface card (NIC), and any other network hardware comprising a physical link by which bits are physically transmitted during network communication. In embodiments, each link 80 has an amount of hardware associated with operating the link 80, e.g., a chip or a portion of a chip dedicated to the actual transmission and/or reception of bits on the wire. Operation of the hardware associated with each link 80 requires electrical power. Physical links are typically maintained in a full power state (e.g., the normal operational power state) even when they are not transmitting their full capacity of data. This consumes a large amount of electrical power both for maintaining the links in a full power state and also for operating cooling equipment that is typically necessary for maintaining hardware at acceptable operational temperatures.

A plurality of individual physical links, such as links 80, may be aggregated in a link aggregation group (LAG) to increase bandwidth over a port or to increase availability/reliability of a port. Such aggregation of links is referred to as link aggregation and is defined by IEEE 802.1AX-2008. Link aggregation is also referred to port bonding, Ethernet bonding, NIC teaming, Trunking, port channel, link bundling, EtherChannel, Multi-link trunking (MLT), and NIC bonding, to name a few.

A first type of link aggregation, i.e., port aggregation bonding, permits the scaling of I/O by combining two or more adjacent ports to create a single network channel of high bandwidth from the two or more channels of lower bandwidth. A second type of link aggregation, i.e., high availability bonding, combines two or more ports to provide port failover services or back-up ports, such that if the primary port fails a secondary port in the high-availability bond takes over to enable services to continue without any interruptions. This link aggregation, also referred to herein as port bonding, generally creates a situation in which one or more of the physical links is being underutilized, e.g., the physical link is transmitting less data than it is capable of transmitting. Disadvantageously, however, all of the links are in a full power state in these port bonding schemes, which can be wasteful of electrical power.

In a particular exemplary embodiment, the computing device 14 comprises a SIP application server (SIP A/S) and the network apparatus 70 comprises at least one hardware switch with physical links 80 used in the physical transmission of data to/from participants in SIP conferencing associated with the SIP A/S. In implementations, the power manager 60 may operate to force one or more of the links 80 into a low power state based on estimates of data transmission derived from the SIP conferencing data. In this manner, only the links necessary for handling the estimated data transmission are placed in a full power state, and redundant or underutilized links are placed in a low power state (e.g., which uses less electrical power than the full power state) to achieve power savings.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
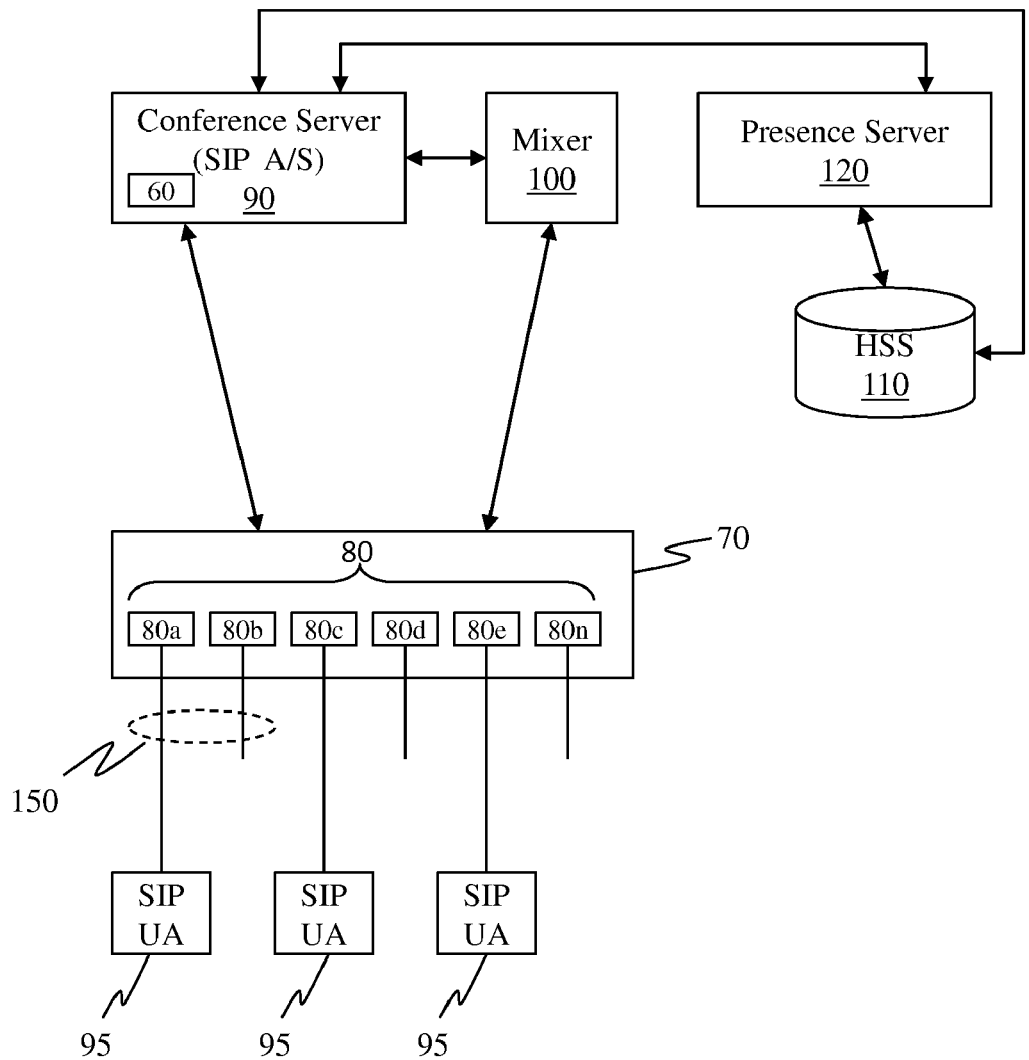
FIG. 2 shows a system in accordance with aspects of the invention.

FIG. 2 shows a system implemented in an IMS based network in accordance with aspects of the invention, the system comprising a conference server 90 which may comprise a SIP application server (SIP A/S) such as the computing device 14 including power manager 60 described with respect to FIG. 1. The system also includes at least one network apparatus 70 having a plurality of physical links 80 for transmitting data to/from one or more SIP endpoints 95, which are also individually referred to a user agent (UA). The endpoints 95 may comprise any suitable SIP-compatible communication device, such as but not limited to an IP phone, PSTN phone, softphone, etc., and may be operatively connected to the network in any suitable manner, including: PSTN, mobile telephony (e.g., 2G, 3G, etc.), wireless broadband, wireline broadband, etc. In embodiments, the endpoints 95 are subscribers of the IMS and may become participants in a SIP conference supported by the conference server 90.

The system may further comprise a mixer 100 that communicates with the network apparatus 70 and the conference server 90. In embodiments, the mixer 100 receives media streams from conference participants (e.g., endpoints 95) during SIP conferencing, mixes the media streams, and redistributes the appropriate media to respective ones of the endpoints 95. The mixer 100 may be comprised in the conference server 90 or may be a separate entity.

In embodiments, the system additionally comprises a Home Subscriber Service (HSS) 110. The HSS (or User Profile Server Function (UPSF)) 110 is a master user database that supports the IMS network entities that actually handle calls. In embodiments, the HSS 110 contains the subscription-related information (subscriber profiles associated with the endpoints 95), performs authentication and authorization of the subscriber, and can provide information about the subscriber's physical location. The HSS 110 may function as a centralized control and management point that controls a subscriber's devices, preferences, and features. For example, the HSS 110 knows what devices a subscriber has, which ones are registered on the network, and how to contact each of them. The HSS 110 is similar to the GSM Home Location Register (HLR), but for IMS networks. In embodiments, the HSS 110 can store the subscriber preferences and can be represented as the storage system 22B of FIG. 1.

The system may further comprise a presence server 120. The presence server 120 in an IMS network allows watchers to monitor changes to presentities. The presence server 120 accepts, stores, and distributes presence information about the subscribers. Presence (e.g., presence state) may constitute, for example, a subscriber's availability and location, as is known such that further explanation is not necessary for a complete understanding of the invention. The presence server 120 may be implemented as a single server or have an internal structure involving multiple servers and proxies. In embodiments, the presence server 120 can obtain information from a common user profile such as the HSS 110. The presence server 120 can also obtain location based information of a user from a location platform (LBS). Once all of the pertinent presence information (e.g., availability, location, etc.) is received at the presence server 120, a SIP notification containing the presence information may be provided to the conference server 90 to inform the conference server 90 of the presence of any one or more of the endpoints 95. The SIP notification may include rich presence documents.

The IMS may comprise any number of SIP servers or proxies, collectively called Call Session Control Function (CSCF), to process SIP signaling packets in the IMS. For example, the IMS may comprise a Serving-CSCF (S-CSCF) as the central node of the signaling plane. The S-CSCF is a SIP server, but performs session control too. The S-CSCF interfaces to the HSS 110 to download and upload user profiles. The S-CSCF handles SIP registrations, which allows the S-CSCF to bind the user location (e.g., the IP address of the terminal) and the SIP address. Additionally, the S-CSCF sits on the path of all signaling messages, and can inspect every message. The S-CSCF decides to which application server(s) the SIP message will be forwarded, in order to provide their services and enforces the policy of the network operator.

The IMS may also include a Proxy-CSCF (P-CSCF), which is a SIP proxy that is the first point of contact for the IMS control plane. In embodiments, the terminal discovers its P-CSCF with either DHCP, or it is assigned in the PDP Context (in General Packet Radio Service (GPRS)).

The IMS may additionally include an Interrogating-CSCF (I-CSCF), which is another SIP function located within the service provider domain. The I-CSCF IP address is published in the Domain Name System (DNS) of the domain, so that remote servers can find it, and use it as a forwarding point (e.g., registering) for SIP packets to this domain. As should be understood by those skilled in the art, aspects of the service provider domain, e.g., the IMS control plane, S-CSCF, P-CSCF, and I-CSCF, as well as SIP communications are known to those skilled in the art. As such, a further description of these aspects is not deemed necessary for an understanding of the present invention.

Still referring to FIG. 2, the system comprises at least one network apparatus 70 comprising a plurality of physical links 80*a*-80*n* (collectively referred to as links 80) that transmit data in the network. As described herein, the at least one network apparatus 70 may comprise any suitable hardware at any location within the network, such as, for example: one or more routers, one or more switches, one or more NIC, etc. Each link 80*a*-*n* may be any suitable type of physical link that physically transmits bits through the network, such as link in either the MAC or PHY layers. In embodiments, the network apparatus 70 may be comprised in a same computing device as the conferencing server 90. Alternatively, the network apparatus 70 may be a different computing device than the conferencing server 90.

Respective ones of the links 80 may be aggregated (e.g., port bonded) together into one or more LAGs using known programming techniques. Also, one or more links 80 in an existing LAG may be removed from the LAG using known programming techniques.

In accordance with aspects of the invention, the links 80 are capable of operation in at least two states: a full power state and a low power state. In embodiments, the low power state is a standby (or sleep) state and uses less electrical power than the full power state. In embodiments, a link is not completely turned off in the low power state, but rather is reduced to a dormant state in which the link does not perform data transmission and from which the link can be quickly ramped up to the full power state without rebooting. A link may also have an OFF state in which the link is completely shut down and requires a reboot prior to being able to perform data transmission.

For example, in embodiments utilizing a one or more NICs as the links 80, a NIC in a low power state may be programmed such that data traffic and power is not directed to the link except to ensure that the link remains clock synchronized. Additionally, placing a link in a low power state may force the link into an idle or standby state where the link is not receiving any communication. The NIC software driver may be programmed to save the state of the NIC prior to the low power state, and have the logic to power it down as well as wake the NIC and re-load its previous (e.g., saved) state. Although a NIC is described in this and other examples herein, it is understood that the invention in not limit to use with NICs, and that these techniques may be applied to any type of physical link.

In accordance with aspects of the invention, the power manager 60 in the conference server 90 identifies one or more of the links 80 to place in a low power state and instructs the network apparatus 70 to force the one or more identified links 80 into a low power state to reduce energy consumption. The network apparatus 70 may implement the instruction to force the link to a low power state using any suitable combination of hardware, firmware, and software, such as in the form of a driver or control program that is executed by the network apparatus 70 upon receipt of the instruction. For example, referring to FIG. 2, links 80*a*, 80*c*, and 80*e* are set to a full power state for communicating with endpoints 95, while links 80*b*, 80*d*, and 80*n* are set to a low power state to conserve energy. Any two or more of the links 80 may be port bonded in a LAG, such as, for example, links 80*a* and 80*b* in LAG 150. Programming and controlling a PCIe (Peripheral Component Interconnect Express) NIC or switch between low and full power states is currently feasible, as should be understood by those having ordinary skill in the art.

In embodiments, a teaming layer from the operating system of the conference server 90 may instruct the network apparatus 70 to put the identified link(s) 80 into the low power state after it has negotiated and re-distributed the data transmission load to one or more remaining active links 80 (e.g., redistributed the data transmission load to one or more full power links). In any of the power saving methods described herein, one or more links 80 in one or more network apparatus 70 may be placed in the low power state regardless of whether the identified link is currently in a LAG. When placed in a low power state, a link 80 that is currently in a LAG may be removed from the LAG or, alternatively, may remain in the LAG in the low power state. Alternatively to being placed in a low power state, one or more links may be completely powered down. However, it is advantageous in some situations to maintain a link in a low power state rather than completely powering down in order to ensure clock synchronization and also affect a faster return to being in a full power state.

Figure 3:
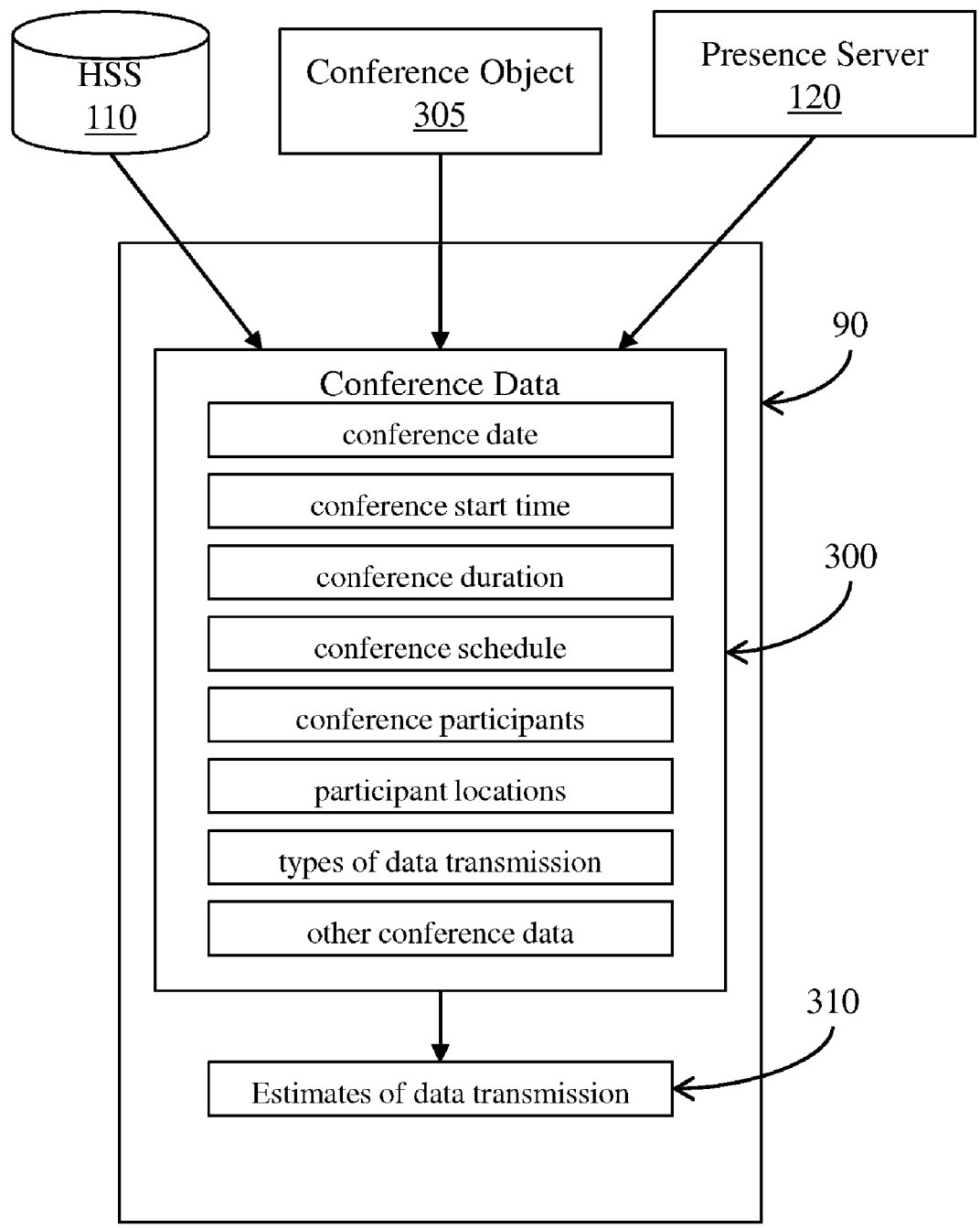
FIG. 3 shows a block diagram in accordance with aspects of the invention.

In accordance with aspects of the invention, the identification of links 80 to place (e.g., set) in the low power state is based on data associated with the SIP conferencing in combination with logic and/or rules for estimating data transmission using such data. As depicted in the block diagram in FIG. 3, the conference server 90 determines conference data 300 including at least one of: conference date, conference start time, conference duration, conference schedule, number of participants (e.g., connected endpoints 95) at any given time, location of participants, network connections used by the respective participants, and type of data that is expected to be transmitted to and from the participants. The conference server 90 determines this conference data 300 from data available from the HSS 110, presence server 120, and conference object 305. In embodiments, the conference server 90 uses this conference data 300 to determine estimates of data transmission 310 to/from endpoints 95 at particular times, as described in greater detail herein.

Figure 4:
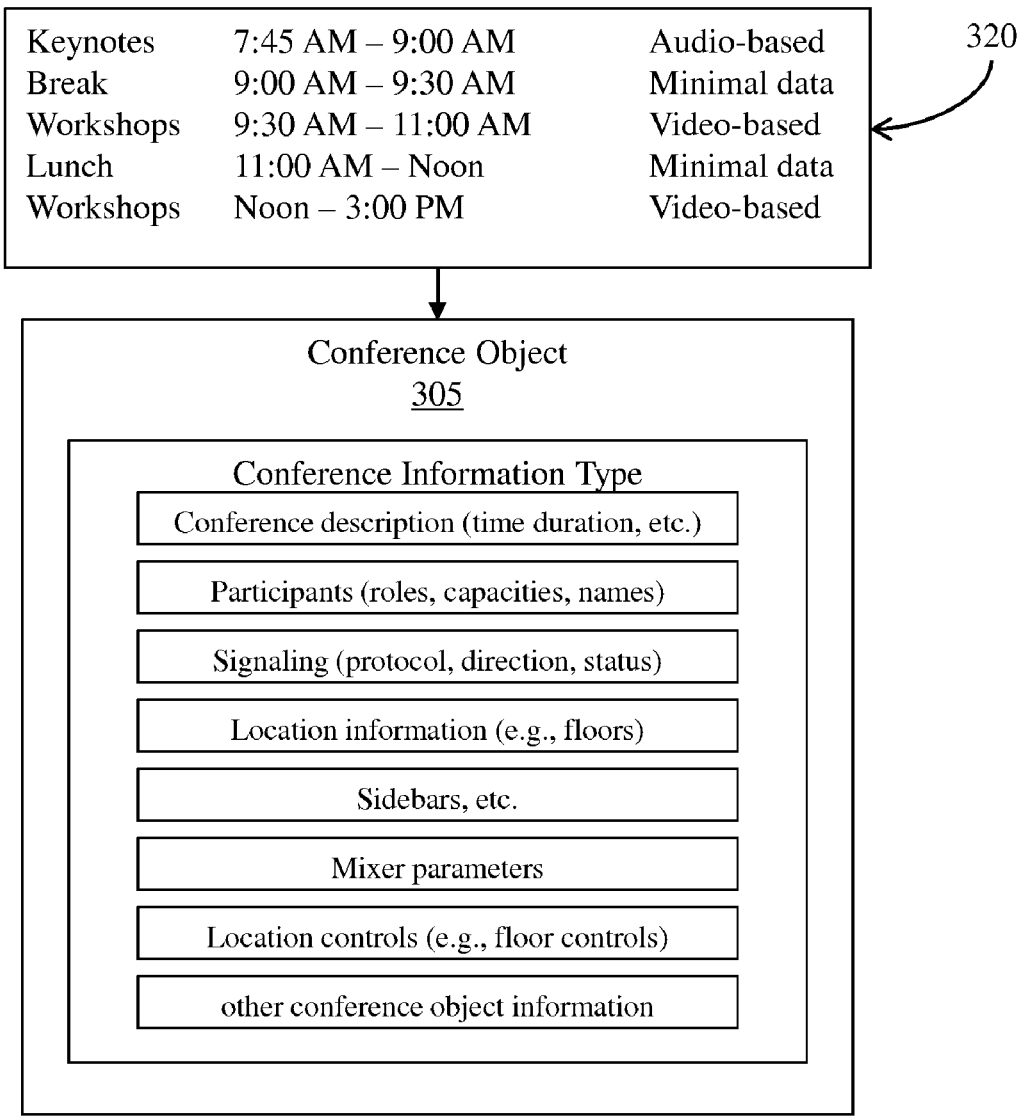
FIG. 4 shows a conference object in accordance with aspects of the invention.

FIG. 4 depicts an exemplary conference object 305. In embodiments, the conference object 305 comprises a data structure that logically represents aspects of the conference, such as: conference information type; conference description; membership; signaling; location information; sidebars; mixer parameters; location controls; and any other desired data. Any of the data in the conference object 305 may be defined prior to the start of the conference, such as conference schedule 320 (e.g., date, start time, break, lunch, end time, etc.), expected participants, expected locations, etc. Additionally, the data stored in the conference object may change as the conference progresses, e.g., based on participants joining and leaving the conference.

According to aspects of the invention, the conference server 90 uses the conference data to estimate data transmission to/from endpoints 95 at particular times. Based on the estimated data transmission to/from respective endpoints 95 at particular times, and in combination with knowledge of the location and capacity of each link 80 of each network apparatus 70, the conference server 90 may optimize the network by powering up to full power only the minimum number of links 80 that are necessary for handling the data transmission associated with the conference while simultaneously forcing other links 80 into a low power state. For example, the conference server may utilize an optimization algorithm that minimizes power consumption based on the estimated data transmission to respective endpoints 95 at particular times in combination with knowledge of the location and capacity of each link 80 of each network apparatus 70. For example, the power manager in the conference server may apply an optimization function configured to minimize power consumption and provide adequate data transmission capability for the estimated data transmission.

In embodiments, the logic and/or rules for estimating data transmission are predefined and stored in the conference server 90, or are stored remote from the conference server and available to the conference server 90. The logic and/or rules may be based on any suitable technique for estimating data usage. For example, the logic and/or rules may define a fixed relation between any one or more of the conference data parameters and expected data transmission based on historically observed values. Additionally or alternatively, the logic and/or rules may employ fuzzy logic and/or a learning algorithm that affects the relation between any one or more of the conference data parameters and expected data transmission.

In embodiments, the estimated data transmission (also referred to as data usage) may change over time due to changes in the conference data. For example, the conference schedule may be used to estimate that certain time periods will be associated with relatively low or relatively high data transmission. For example, the conference schedule may define respective time periods for: waiting for participants to log in, one-way audio transmission to participants (e.g., keynotes), video feed to participants, break time, discussion session amongst all participants (e.g., video workshops), etc., to name but a few, all of which may have different amounts of estimated data traveling to/from the participants. As such, one or more links 80 that are in a low power state may be powered up to a full power state to support increased data loads based on such time-based scheduling. Additionally, one or more links 80 that are in a full power state may be forced into a low power state based upon the changed estimates of data usage. In this manner, implementations of the invention may be used in a look-ahead manner to proactively optimize the physical links for power savings based on estimated (e.g., predicted) data loads on the network.

In further embodiments, the estimated data transmission may change over time based on actual occurrences. For example, although the conference object may indicate an expected number of participants connecting from respective locations, the actual number of participants that sign in to the conference and/or the actual location of any respective participant may differ from that indicated in the conference object. In such circumstances of changed conference data, the conference server 90 may update the estimates of data transmission based on the newest available conference data. The estimates may be updated by the conference server 90 at any desired frequency, including but not limited to: based on predetermined time interval, based on occurrence of an event (e.g., a participant signs in to the conference or drops off the conference, etc.), and when data is pushed to the conference server (e.g., a subscriber's presence information via a SIP notification from the presence server 120, etc.).

In particular embodiments of the invention, information from the presence server 120 may be leveraged to update the estimated data usage associated with the SIP conference, and the updated estimated data usage may be used to refine the network optimization by instructing one or more links 80 to go to full power or low power mode. For example, data contained in the conference object may indicate that a particular participant is expected to attend the conference from a particular location. At a time within a predefined time period prior to the scheduled start time of the conference, the presence server 120 may indicate that the participant is at another location different from the expected location. In embodiments, the conference server 90 may be programmed to assume, when such a disparity between an expected location and an actual location occurs within a predefined time period prior to the scheduled start time of the conference, that the particular user will be connecting to the conference from their current actual location rather than the location indicated in the conference object. This updated location information for the particular user may constitute updated conference data upon which the conference server 90 may change the estimates of data usage and, accordingly, change the power state of one or more physical links 80.

In accordance with aspects of the invention, the identified links set to the low power state may change based on a change in conference data. For example, referring back to the system shown in FIG. 2, initial conference data may yield estimates of data transmission that result in links 80*a*, 80*c*, and 80*e* being set to the full power state and links 80*b*, 80*d*, and 80*n* being set to the lower power state at a first time. At a later time, new (e.g., updated or changed) conference data may yield new estimates of data transmission that result in link 80*b* being powered up to the full power state and link 80*c* being set to the low power state. In this manner a first subset of links corresponding to low power links and a second subset of links corresponding to full power links may change over time.

Implementations of the invention provide the advantage of lowering the power of an underutilized port group (LAG), which leads to power savings and cost savings in terms of electricity and cooling. The power savings obtained may depend upon how long the links are in the low power state and how many links (and associated logic) that are put into the low power state. Conventional systems, on the other hand, do not sense conference data (e.g., conference agenda, presence information, etc.) to leverage knowledge about software instructions which will execute in the near future and estimate the amount of data to be transferred over the Ethernet. As such, conventional systems do not proactively power up minimal number of links and power down the rest of the network apparatus such that good performance is achieved along with power saving.

Flow Diagram

Figure 5:
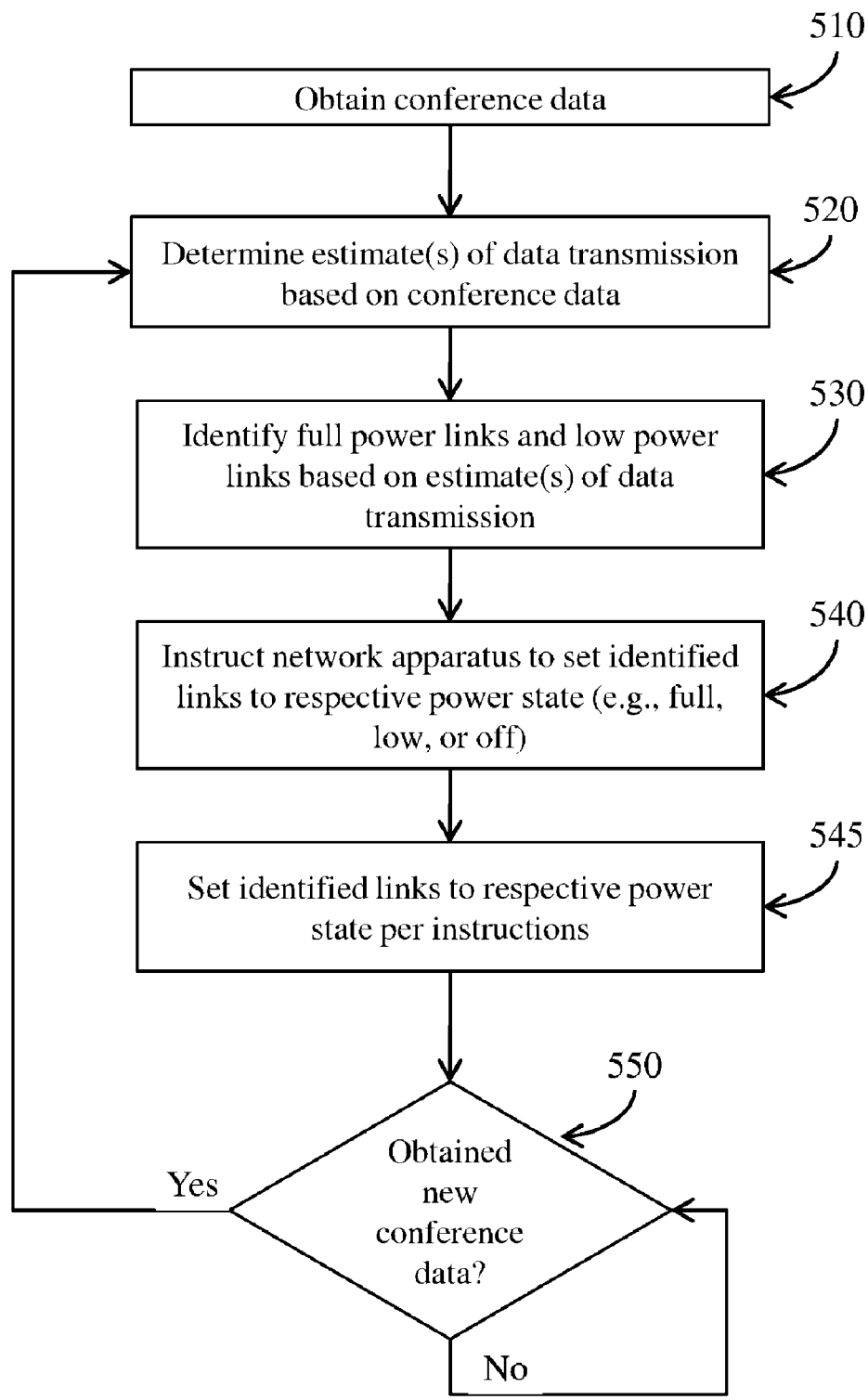
FIG. 5 shows an exemplary flow in accordance with aspects of the invention.

FIG. 5 shows an exemplary flow for performing aspects of the present invention. The steps of FIG. 5 may be implemented in the environment of FIG. 1 and/or FIG. 2, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 1 and/or FIG. 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 5 depicts an exemplary flow for a process in accordance with aspects of the present invention. At 510 the conference server (such as conference server 90) obtains conference data. In embodiments, the conference server obtains the conference data from at least one of the HSS, presence server, and conference object, as described above with respect to FIGS. 2-4. The conference data may include, but is not limited to: conference date, conference start time, conference duration, conference schedule, number of participants (e.g., connected endpoints 95) at any given time, location of participants, network connections used by the respective participants, and type of data that is expected to be transmitted to and from the participants, and any other data that is contained within the conference object.

At step 520, the conference server estimates future data transmission based on the obtained conference data. As described above with respect to FIGS. 2-4, the estimated data transmission may be determined using logic and/or rules that define one or more relationships between one or more of the conference data parameters and an expected amount of data transmission.

At step 530, the conference server identifies a first subset of physical links to be maintained at a full power state to facilitate the estimated data transmission and a second subset of physical links to be forced to a low power state as being not needed for the estimated data transmission. As described above with respect to FIGS. 2-4, the determination of which links to use at full power and which to force to a low power state may be performed using any suitable optimization algorithm that minimizes power consumption based on the estimated data transmission.

At step 540, the conference server instructs at least one network apparatus to set the first subset of links to the full power state and to set the second subset of links to the low power state. The instructions may be communicated from the conference server to the at least one network apparatus in any suitable manner.

At step 545, the at least one network apparatus sets the identified links to the appropriate states (e.g., low power or full power) based on the instructions. In embodiments, a driver or control program is executed by the network apparatus 70 upon receipt of the instructions to carry out the instructions.

At step 550, the conference server determines whether the conference data has changed. As described above with respect to FIGS. 2-4, this may be accomplished by obtaining new data from at least one of the HSS, presence server, and conference object. If the conference data has not changed, then the process loops back to step 550 and essentially waits for a change in conference data. If the conference data has changed, then the process returns to step 520 to determine new estimates of data transmission based on the changed (e.g., updated) conference data, followed by step 530 to update the identification of full power links and low power links, followed by steps 540 and 545. When new or updated conference data is used to determine new estimates of data transmission, this may lead to a change in the first and second subsets of links, i.e., which links are set to the high power state and which are set to the low power state.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented in a computer infrastructure having computer executable code tangibly embodied on a computer readable storage medium having programming instructions operable to implement the steps of the method, comprising:
    determining a first subset of a plurality of links to be set to a first power state and a second subset of the plurality of links to be set to a second power state, different from the first power state, based on estimated data transmission; and
    instructing at least one network apparatus to set the first subset of the plurality of links to the first power state and to set the second subset of the plurality of links to the second power state.

2. The method of claim 1, wherein the first power state is a full power state and the second power state is a low power state that is lower than the full power state.

3. The method of claim 1, wherein links comprised in the plurality of links are physical links configured to transmit bits in network communications.

4. The method of claim 1, further comprising determining the estimated data transmission based on conference data associated with Session Initiated Protocol (SIP) conferencing.

5. The method of claim 4, further comprising obtaining the conference data obtained from at least one of: a Home Subscriber Service (HSS), a presence server, and a conference object.

6. The method of claim 5, further comprising:
    obtaining new conference data;
    determining new estimated data transmission based on the new conference data;
    determining a new first subset of the plurality of links to be set to the first power state and a new second subset of the plurality of links to be set to the second power state based on the new estimated data transmission; and
    instructing the at least one network apparatus to set the new first subset of the plurality of links to the first power state and to set the new second subset of the plurality of links to the second power state.

7. The method of claim 4, wherein the conference data comprises at least one of: conference schedule, number of conference participants, locations of participants, network connections utilized by participants, type of data being transferred during the conference, and video feed quality.

8. The method of claim 4, wherein:
    the at least one network apparatus comprises at least one of: at least one router, at least one switch, and at least one network interface card (NIC);
    the at least one network apparatus comprises the plurality of links;
    the plurality of links comprises physical links configured to transmit and/or receive bits in network communications;

the first power state is a full power state;
the second power state is a low power state; and
at least one link in the second subset of the plurality of links is bonded in a link aggregation group (LAG) and is set to the low power state while maintained in the LAG.

9. The method of claim 1, wherein a service provider at least one of creates, maintains, deploys and supports the computer infrastructure.

10. The method of claim 1, wherein steps of claim 1 are provided by a service provider on a subscription, advertising, and/or fee basis.

11. A system, comprising a conference server comprising a processor, a memory, and a power manager application, wherein the power manager application operates to:
   obtain conference data;
   determine estimated future data transmission based on the conference data;
   identify at least one first link to be set in a high power state and at least one second link to be set in a low power state based on the estimated future data transmission; and
   instruct at least one network apparatus to set the at least one first link to the high power state and to set the at least one second link to the low power state.

12. The system of claim 11, wherein links comprised in the plurality of links are physical links configured to transmit bits in network communications.

13. The system of claim 11, wherein the conference data is associated with Session Initiated Protocol (SIP) conferencing.

14. The system of claim 13, wherein the conference server obtains the conference data from at least one of: a Home Subscriber Service (HSS), a presence server, and a conference object.

15. The system of claim 14, wherein the conference server operates to:
   obtain updated conference data;
   determine updated estimated data transmission based on the new conference data;
   identify at least one updated first link to be set in the high power state and at least one updated second link to be set in the low power state based on the updated estimated data transmission; and
   instruct the at least one network apparatus to set the at least one updated first link to the high power state and to set the at least one updated second link to the low power state.

16. The system of claim 13, wherein the conference data comprises at least one of: conference schedule, number of conference participants, locations of participants, network connections utilized by participants, type of data being transferred during the conference, and video feed quality.

17. The system of claim 13, wherein:
   the at least one network apparatus comprises at least one of: at least one router, at least one switch, and at least one network interface card (NIC);
   the at least one network apparatus comprises the plurality of links;
   the plurality of links comprises physical links configured to transmit and/or receive bits in network communications;
   at least one link in the second subset of the plurality of links is bonded in a link aggregation group (LAG) and is set to the low power state while maintained in the LAG.

18. A computer program product comprising a computer usable storage medium having readable program code embodied in the storage medium, the computer program code when executed on a computing device causes the computing device to:
   obtain conference data associated with Session Initiated Protocol (SIP) conferencing;
   determine estimated data transmission based on the conference data;
   identify a first subset of a plurality of links to be set in a high power state and a second subset of the plurality of links to be set in a low power state based on the estimated data transmission; and
   instruct at least one network apparatus to set the first subset of a plurality of links to the high power state and to set the second subset of a plurality of links to the low power state.

19. The computer program product of claim 18, wherein the obtaining the conference data comprises obtaining the conference data from at least one of: a Home Subscriber Service (HSS), a presence server, and a conference object.

20. The computer program product of claim 18, wherein the conference data comprises at least one of: conference schedule, number of conference participants, locations of participants, network connections utilized by participants, type of data being transferred during the conference, and video feed quality.

21. A computer system for optimizing power usage in a network, the system comprising:
   a CPU, a computer readable memory, and a computer readable storage media;
   first program instructions to obtain conference data associated with Session Initiated Protocol (SIP) conferencing;
   second program instructions to determine estimated data transmission based on the conference data;
   third program instructions to identify a first subset of a plurality of links to be set in a high power state and a second subset of the plurality of links to be set in a low power state based on the estimated data transmission; and
   fourth program instructions to instruct at least one network apparatus to set the first subset of a plurality of links to the high power state and to set the second subset of a plurality of links to the low power state,
   wherein the first, second, third, and fourth program instructions are stored on the computer readable storage media for execution by the CPU via the computer readable memory.

22. The computer system of claim 21, wherein the identifying the first and second subsets of the plurality of links comprises applying an optimization function configured to minimize power consumption and provide adequate data transmission capability for the estimated data transmission.

23. The computer system of claim 21, wherein at least one link in the second subset of the plurality of links is bonded in a link aggregation group (LAG) and is set to the low power state while maintained in the LAG.

24. The computer system of claim 21, wherein the obtaining the conference data comprises:
   obtaining subscriber information from a Home Subscriber Service (HSS);
   obtaining presence information from a presence server; and
   obtaining a conference schedule from a conference object.

25. A method implemented in a computer infrastructure having computer executable code tangibly embodied on a computer readable storage medium having programming instructions operable to implement the steps of the method, comprising:

obtaining conference data associated with Session Initiated Protocol (SIP) conferencing;

determining estimated data transmission based on the conference data;

determining a first subset of a plurality of links to be set to a high power state and a second subset of the plurality of links to be set to a low power state, lower than the high power state, based on the estimated data transmission; and instructing at least one network apparatus to set the first subset of the plurality of links to the high power state and to set the second subset of the plurality of links to the low power state, wherein the at least one network apparatus comprises at least one of: at least one router, at least one switch, and at least one network interface card (NIC);

the at least one network apparatus comprises the plurality of links;

the plurality of links comprises physical links configured to transmit and/or receive bits in network communications;

at least one link in the second subset of the plurality of links is bonded in a link aggregation group (LAG) and is set to the low power state while maintained in the LAG; and the obtaining the conference data comprises: obtaining subscriber information from a Home Subscriber Service (HSS); obtaining presence information from a presence server; and obtaining a conference schedule from a conference object.

* * * * *